United States Patent
Dillaway et al.

(10) Patent No.: US 7,797,544 B2
(45) Date of Patent: Sep. 14, 2010

(54) ATTESTING TO ESTABLISH TRUST BETWEEN COMPUTER ENTITIES

(75) Inventors: Blair B. Dillaway, Clyde Hill, WA (US); Paul England, Bellevue, WA (US); Marcus Peinado, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1229 days.

(21) Appl. No.: 10/734,028

(22) Filed: Dec. 11, 2003

(65) Prior Publication Data
US 2005/0132202 A1 Jun. 16, 2005

(51) Int. Cl.
*H04L 9/32* (2006.01)
(52) U.S. Cl. ...................... 713/179; 713/169
(58) Field of Classification Search .......... 713/179, 713/157
See application file for complete search history.

(56) References Cited

U.S. PATENT DOCUMENTS

| | | | | |
|---|---|---|---|---|
| 5,214,700 A | * | 5/1993 | Pinkas et al. | 713/156 |
| 2004/0117625 A1 | * | 6/2004 | Grawrock | 713/168 |
| 2004/0148505 A1 | * | 7/2004 | Qiu | 713/175 |
| 2005/0033987 A1 | * | 2/2005 | Yan et al. | 713/201 |

* cited by examiner

*Primary Examiner*—Nasser Moazzami
*Assistant Examiner*—Carlton V Johnson
(74) *Attorney, Agent, or Firm*—Woodcock Washburn LLP (57) ABSTRACT

To establish trust between first and second entities, the first entity sends an attestation message to the second entity, including a code ID, relevant data, a digital signature based on the code ID and data, and a certificate chain. The second entity verifies the signature and decides whether to in fact enter into a trust-based relationship with the first entity based on the code ID and the data in the attestation message. Upon so deciding, the second entity sends a trust message to the first entity, including a secret to be shared between the first and second entities. The first entity obtains the shared secret in the trust message and employs the shared secret to exchange information with the second entity.

28 Claims, 4 Drawing Sheets

ATTESTING TO ESTABLISH TRUST BETWEEN COMPUTER ENTITIES

CROSS-REFERENCE TO RELATED APPLICATIONS

The present application is related to U.S. patent application Ser. No. 10/692,224, file Oct. 23, 2003 and hereby incorporated herein by reference in its entirety.

TECHNICAL FIELD

The present invention relates to a method and mechanism by which a first computer type entity can attest trustworthiness to a second computer-type entity. More specifically, the present invention relates to such a method and mechanism whereby the first entity can make the attestation even if the first entity has no prior knowledge of the second entity and whereby the second entity can receive and rely upon the attestation even if the second entity has no prior knowledge of the first entity.

BACKGROUND OF THE INVENTION

In many computer scenarios, a first computer-type entity is in substantive communication with a second computer-type entity to exchange some sort of information. As may be appreciated, each of the first and second entities may be a hardware or software entity, such as a computer program or executable, a computer storage device, a computer data server, or the like. Likewise, the information may be raw data, a file with the raw data therein in some organized fashion, some other resource, or the like.

Especially in the case where the information is of especial value or is to be handled in accordance with pre-defined rules, it may be the case that one of the entities such as the second entity will not enter into such substantive communication with the other of the entities such as the first entity unless the first entity can establish to the satisfaction of the second entity that the second entity should trust the first entity. For example, if a server at a banking institution (the second entity) is providing a security key (the information) to a banking program at a user's computer (the first entity) by which the user can conduct banking transactions at the computer, the server may demand to have some assurance that the banking program can be trusted to employ the security key in a manner amenable to the bank.

That is, the server wants an attestation from either the banking program itself or an attestor on behalf of the banking program that the banking program is to be trusted. Such attestation may for example be based on the banking program being of a certain type, running in a certain environment based on certain variables, and/or the like. Thus, the server in fact provides the security key to the banking program only after such an attestation has been proffered by or on behalf of the banking program and only after such proffered attestation has been authenticated or otherwise reviewed and approved. Of particular importance, the server in authenticating the banking program based on the attestation therefor wishes to ensure that the banking program has not been altered in a way such as for example to misuse the security key, and also wishes to ensure that the banking program is not operating in an environment where the security key can be diverted to or read by a questionable entity such as a thief.

A need exists, then, for a method and mechanism by which a first computer-type entity can provide such an attestation to a second computer-type entity. In particular, a need exists for such a method and mechanism whereby the first entity can make the attestation even if the first entity has no prior knowledge of the second entity and whereby the second entity can receive and rely upon the attestation even if the second entity has no prior knowledge of the first entity.

SUMMARY OF THE INVENTION

The aforementioned needs are satisfied at least in part by the present invention in which a method is set forth to establish trust between independent first and second computer-type entities. The first entity operates in a trusted manner on a computing device and seeks a trust-based relationship with the second entity. The first entity thus constructs an attestation message to be delivered to the second entity, where the attestation message includes a code identifier (code ID) representative of the first entity and data relevant to the purpose of the trust-based relationship, and where the second entity has knowledge of each valid code ID corresponding to the first entity. The first entity appends a digital signature to the attestation message and a certificate chain leading back to a trusted root authority, where the signature is based on the code ID and data thereof and is verifiable based on a security key included in the certificate chain, and where the certificate chain includes at least one certificate therein proffering trustworthiness of the computing device of the first entity. Thereafter, the first entity sends the attestation message to the second entity and the second entity receives same.

The second entity verifies the signature of the received attestation message based on the included security key, where alteration of the code ID or data of the attestation message should cause the signature to fail to verify, and where the second entity based on such a failure dishonors such attestation message. The second entity then decides whether to in fact enter into the trust-based relationship with the first entity based on the code ID and the data in the attestation message. Upon so deciding, the second entity constructs a trust message to be delivered to the first entity, where the trust message establishes the trust-based relationship and includes therein a secret to be shared between the first and second entities, and where such shared secret allows such first and second entities to communicate in a secure manner. The second entity then sends the trust message to the first entity and the first entity receives same.

The first entity obtains the shared secret in the trust message and employs the shared secret to exchange information with the second entity according to the established trust-based relationship with such second entity.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
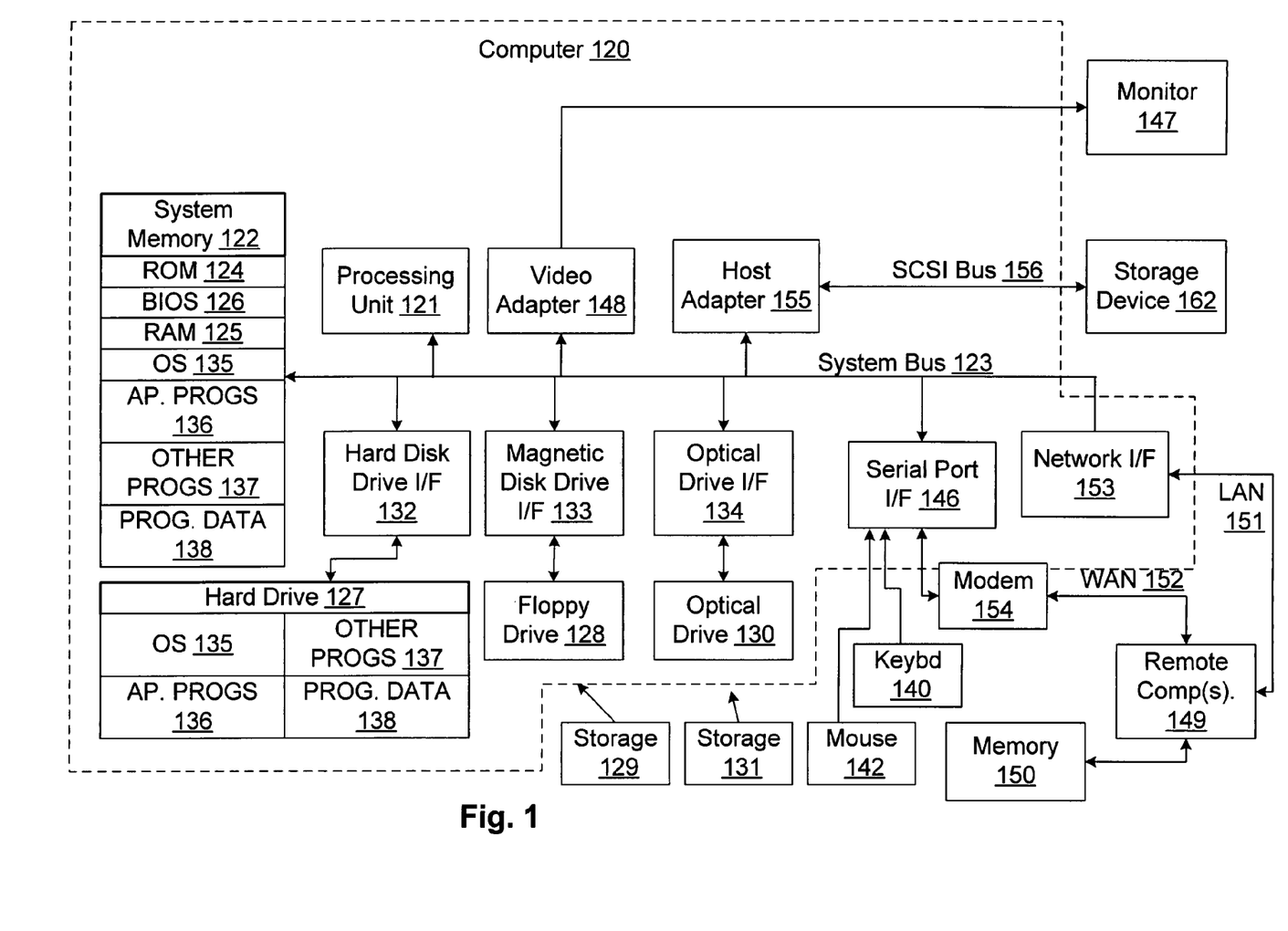
FIG. 1 is a block diagram showing an enforcement architecture of an example of a trust-based system.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Trust-Based Attestation

In the present invention, a mechanism is provided to communicate and negotiate code identity-based trust information between independent first and second computer-type entities that may or may not have prior knowledge of each other. Generally, a two-party message protocol is employed to carry an attestation of trust and associated data from the first entity to the second entity, as well as a protocol to negotiate terms of the attestation and a protocol to negotiate security parameters for use in subsequent interactions between the first and second entities.

Such an attestation mechanism forms a core component of a security model and provides protocols that allow a developer to create peer-to-peer and client-server applications that leverage known properties of code running on another system. As a result, secure distributed applications may be developed that enforce data confidentiality, data privacy, and known computational characteristics. Moreover, such protocols can be applied even as between otherwise independent first and second computer-type entities, thus promoting trusted interoperability between such first and second entities.

Examples of trust information that may be exchanged in connection with an attestation include but are not limited to: asymmetric authentication where the identity of code running on a platform is communicated to another entity; symmetric authentication where two parties mutually exchange information about the code running in their environment; asymmetric secret sharing where an entity delivers a secret to specified code running on a platform; symmetric secret sharing where two parties mutually exchange secret information to specified code running on each platform; key negotiation between two parties with or without message replay detection; certification of secrets, or cryptographic keys, as being associated with a specific code identity proven via attestation; and the like.

In one embodiment of the present invention, and turning now to FIG. 2, a first computer-type entity 10 offers a trust-based attestation to a second computer-type entity 12 in the following manner. Preliminarily, it is to be appreciated that the first and second entities 10, 12 may be associated with a common computing device (not shown) or may be associated with different computing devices 14 (shown) without departing from the spirit and scope of the present invention. In the latter case, the first and second entities are presumably coupled by way of an appropriate communications link such as an internal or external communications network. Although each such entity 10, 12 may be hardware- or software-based, as will be set forth below at least the attesting first entity 10 or an agent thereof is operating in a trusted manner on the computing device 14 thereof and therefor is imparted a relatively high level of trust. Such trusted manner may be achieved by operating such first entity 10 or agent thereof in an isolated computing environment, perhaps based on a protected hardware component, although other mechanisms for achieving such trusted manner may also be employed without departing from the spirit and scope of the present invention.

Figure 3A:
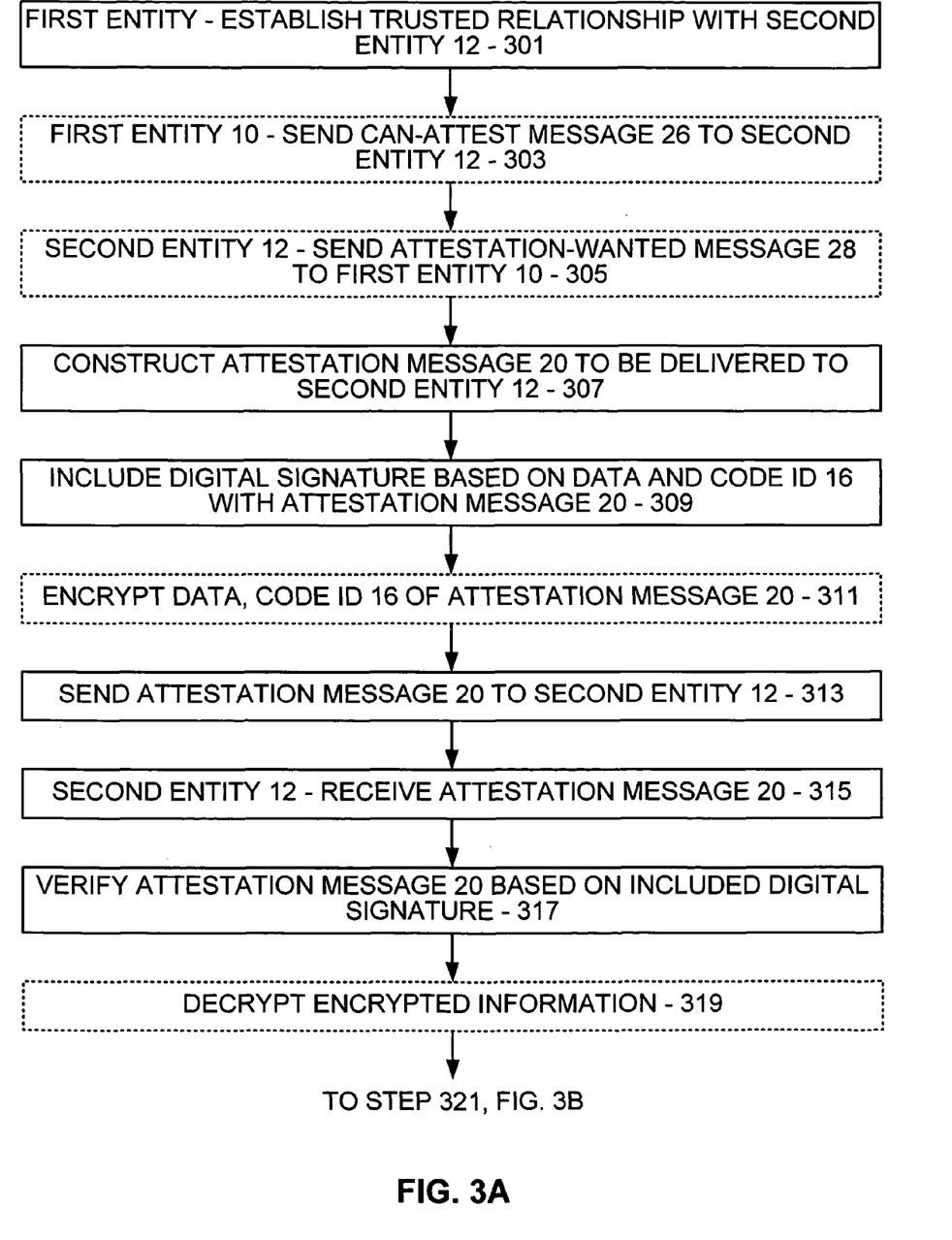
FIGS. 3A and 3B are flow diagrams showing key steps performed by the first and second entities of FIG. 2 in attest-
Figure 3B:
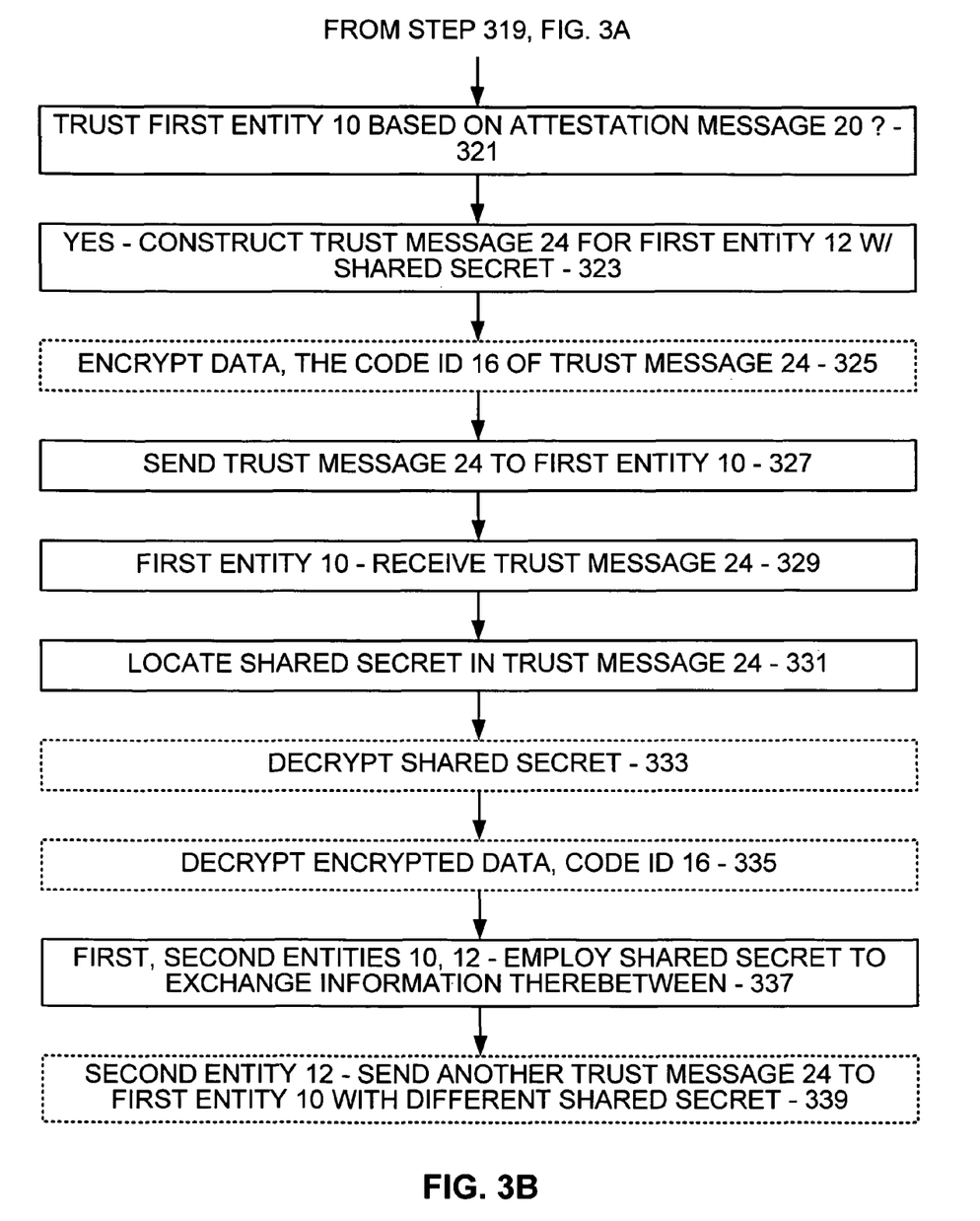

Turning now to FIGS. 3A and 3B, in one embodiment of the present invention, the first entity 10 for whatever reason seeks to establish a trusted relationship with the second entity 12 (step 301) and accordingly constructs an attestation message 20 to be delivered to the second entity 12 (step 307). In particular, the attestation message 20 is constructed to include some sort of data relevant to the purpose of the trusted relationship, and a code identifier or code ID 16 representative of the first entity 10 or the trusted agent thereof (hereinafter, simply, 'the first entity 10').

As may be appreciated, a code ID 16 for a particular first entity 10 is derived or calculated from a digest of the first entity 10 and perhaps security information relating thereto such as an id 18, and is typically a hash of same in a manner akin to that which is employed in a digital signature.

As may also be appreciated, the security information in the id 18, if indeed employed by the first entity 10, specifies security-related aspects of the operation of the first entity 10. In particular, if the first entity 10 wishes to modify its security environment such as for example by reading in a file, opening a debugging port, and the like, such first entity 10 is itself responsible for doing so. However, if a developer developing the first entity 10 wishes to have a particular behavior parameterized, and the parameter has security implications (e.g. open a different file based on program input, or debug based on program input) then the parameter can be placed in the id 18 and the first entity 10 can be written to refer only to the id 18 for the parameter. Thus, although the parameter could potentially be modified within the id 18 by a nefarious entity, the modified id 18 will cause the calculated code ID 16 to change, where such change can be interpreted by an interested party such as the second entity 12 as an indication that the first entity 10 should not be trusted.

In one embodiment of the present invention, the code ID 16 corresponding to a particular first entity 10 is defined as a hash of the first entity 10 concatenated with the id 18 thereof. For one example, the hash may be based on any of several known SHA algorithms, including SHA-1 and SHA-256:

Code ID 16=SHA (first entity 10|id 18)

For another example, the code ID 16 may be a concatenation of two of the aforementioned hashes, where one hash is based on SHA-1 and the other is based on SHA-256:

Code ID 16=SHA-1 (first entity 10|id 18)|SHA-256 (first entity 10|id 18)

Thus, and as should be appreciated, based on knowledge of the first entity 10 and the id 18 thereof, and also on knowledge of the method by which the code ID 16 is to be calculated, a code ID 16 corresponding to such first entity 10 is in fact calculated.

Note that while the first entity 10 may itself calculate the code ID 16, it is more likely the case that the code ID 16 is calculated by a code ID calculator 22 on the computing device 14 of the first entity 10. Such code ID calculator 22 may for example calculate the code ID 16 for the first entity 10 when such first entity 10 is loaded onto the computing device 14. Significantly, the code ID calculator 22 must be trusted by the second entity 12 and by others to calculate the code ID 16 for the first entity 10 in an appropriate manner. Thus, such code ID calculator 22 should itself be operating in a trusted manner on the computing device 14.

Also significantly, each of one or more valid code IDs 16 of the first entity 10 should be well-known, especially by the second entity 12 to which the attestation message 20 is to be directed. Note that the first entity 10 may have more than one valid code ID 16, especially if the first entity 10 comes in multiple versions, is operable on multiple operating systems, etc., each of which necessitates a variation of the first entity 10 and/or the id 18 thereof. Presumably, then, the second entity 12 has knowledge of the first entity 10 and each valid code ID 16 for the first entity 10, and such second entity 12 trusts the first entity 10 based on the attestation message 20 therefrom only if a valid code ID 16 for the first entity 10 is presented to the second entity 12 in the attestation message 20.

The data relevant to the purpose of the trusted relationship that is included with the code ID 16 in the attestation message 20 is the aforementioned trust information and may in fact be any appropriate data without departing from the spirit and scope of the present invention. For example, such included data may comprise an identifier for the first entity 10, a security key that is to be shared with the second entity 12, a digital certificate derived from a trusted root authority with information therein vouching for the first entity 10, an identification of a resource requested by the first entity 10 or to be provided to the second entity 12, and/or the like. Note that such data may in actuality include transactional or other substantive information that is to be shared with the second entity 12 in the course of communication between such first and second entities 10, 12. However, it is more likely the case that once the first entity 10 successfully attests itself to the second entity 12 and the second entity 12 establishes trust in the first entity 10 based on such attestation, the first and second entities 12 will establish a shared secret such as for example a symmetric cryptographic key, and all substantive communications between the first and second entities 12 will be protected according to the established shared secret.

As yet, the attestation message 20 from the first entity 10 to the second entity 12 includes some sort of data and a code ID 16 representative of the first entity 10. In one embodiment of the present invention, the first entity 10 also constructs the attestation message 20 to include a digital signature based on such data and such code ID 16 and a cryptographic key, where the digital signature is verifiable based on other information included in the message 20 (step 309). For example, the message 20 could also include a signature verification key either as part of the data or as part of a certificate chain attached to the signature for verification purposes. Thus, and as should be apparent, the signature verification key can be applied to the signature to verify same. Thus, if a nefarious entity has altered the data or the code ID 16 of the attestation message 20, the signature of such attestation message 20 should fail to verify, and the second entity 12 based on such failure should dishonor such attestation message 20.

Optionally, the first entity 10 could encrypt the data and/or the code ID 16 of the attestation message 20 according to a key available to the second entity 12 (step 311). However, inasmuch as the second entity 12 may not know of the first entity 10 prior to receiving the attestation message 20 therefrom, care must be taken to ensure that such key is in fact available to the second entity 12 but not especially to others.

Once the attestation message 20 is constructed, the first entity 10 in fact sends such attestation message 20 to the second entity 12 by way of an appropriate communications protocol (step 313). Upon receiving such attestation message 20 (step 315), the second entity 12 verifies same based on the included digital signature (step 317). In particular, the second entity 12 locates the signature verification key in the message from wherever such key may be located and applies such key can to the signature to verify same. Thus, and again, if a nefarious entity has altered the data or the code ID 16 of the attestation message 20, the signature of such attestation message should fail to verify, and the second entity 12 based on such failure should dishonor such attestation message 20. In addition, if the first entity encrypted the data and/or the code ID 16 of the attestation message 20 according to a key available to the second entity 12 as at step 311, the second entity locates such key and applies same to the encrypted information to decrypt same (step 319).

In one embodiment of the present invention, the steps of creating the attestation message 20 are performed by application of the relevant information to an appropriate function. For example, such attestation message 20 may be created by the first entity 10 applying the relevant information to a quoting function that automatically creates the attestation message 20 in an appropriate format that is accessible to the second entity 12. In a further embodiment of the present invention, the steps of consuming the attestation message 20 are performed by application of the attestation message 20 to an appropriate function. For example, such attestation message 20 may be consumed by the second entity 10 applying same to a verifying function that automatically verifies the attestation message 20 based on the format thereof and that extracts the relevant information from such verified attestation message 20 for use by the second entity 12.

Once the attestation message 20 is verified and decrypted, the second entity 12 then decides whether to in fact trust the first entity 10 based on the attestation message 20 therefrom (step 321). In particular, the second entity decides based on the code ID 16 and the data in the attestation message 20 whether the first entity 10 is trustworthy. The mechanics and methods that the second entity 12 employs to decide trustworthiness may be any mechanics and methods without departing from the spirit and scope of the present invention. Such mechanics and methods are known or should be apparent to the relevant public and therefore need not be set forth herein in any detail.

When the second entity 12 decides whether to trust the first entity 10 based on the attestation message 20 therefrom as at step 321, the second entity 12 in particular decides based on the code ID 16 in the message 20 whether the second entity 12 can be trusted, and in one embodiment of the present invention also decide based on a certificate chain attached to the digital signature of the message 20 whether the second entity can be trusted. With regard to the former, and as should be appreciated, the code ID 16 identifies the first entity 10, and the second entity 12 can decide based on the identity of the first entity 10 whether the first entity 10 can be trusted, such as for example by determining that the first entity 10 is not on a do-not-trust list. With regard to the latter, and as should also be appreciated, the certificate chain presumably reaches back to a certificate from some root authority and includes certificates from one or more intermediate certificate-issuing entities, and proffers at least in part that the computing device 14 of the first entity 10 should be trusted to instantiate and execute the first entity 10 in a trusted manner. Thus, the second entity 12 can decide based on the identities of the root authority and the intermediate entities as identified from information in the certificates whether the first entity 10 can be trusted, such as for example by determining that each identified root authority or intermediate entity is not on a do-not-trust list.

Note that the second entity 12 decides whether to trust the first entity 10 based at least in part on the code ID 16 thereof. As was mentioned above, the code ID 16 for the first entity 10 should be a well-known value, and therefore finding a code ID 16 in the attestation message 20 from the first entity 10 that is known and that is known to be trustworthy should in itself impart a significant amount of trust in such first entity 10. Nevertheless, an issue arises in that the code ID 16 could be spoofed or otherwise not truly representative of the first entity 12. However, it is to be remembered that the attesting first entity 10 is operating in a trusted manner on the computing device 14 thereof and therefor is imparted a relatively high level of trust to not in fact so spoof or misrepresent the code ID 16. Moreover, it is to be remembered that the code ID 16 for the first entity 10 is likely calculated by the code ID calculator 22 on the computing device 14 of the first entity 10, and that the code ID calculator 22 is itself operating in a trusted manner on the computing device 14 and is trusted to calculate the code ID 16 for the first entity 10 in an appropriate manner. Thus, based on the trust that can be imparted to the first entity 10 and the code ID calculator 22 to calculate and represent the code ID 16 of such first entity 10, the second entity can rightfully rely on the fact that the code ID 16 in the attestation message 16 is not spoofed and is truly representative of the first entity 12.

Put another way, the second entity 12 trusts the first entity 10 as long as (1) the second entity 12 trusts the computing device 14 and code ID calculator 22 of the first entity 10 to properly calculate the code ID 16 that is included in the attestation message 20, and (2) the second entity 12 trusts the first entity 10 as represented by the code ID 16. As should be appreciated, and again, (1) arises from the certificate chain attached to the digital signature of the attestation message 20, and (2) arises from public knowledge of each code ID 16 for the first entity 10 and whether such first entity 10 as represented by such code ID 16 is trustworthy. Thus, each of one or more valid code IDs 16 of a first entity 10 should be well-known, especially by each second entity 12 which is to be asked to establish trust in such first entity 10.

To sum up, then, by finding a valid code ID 16 in an attestation message 20 from a first entity 10, a second entity 12 can conclude based on the valid code ID 16, which is derived from the first entity 10 and the id 18 thereof, that the first entity 10 can be trusted as being a known non-altered first entity 10 that can be presumed to be trustworthy, and also that the security-related information upon which the first entity 10 operates is known non-altered security-related information that can be presumed to be trustworthy. Moreover, it is to be appreciated that by employing code IDs 16, a particular first entity 10 that has been compromised can be dishonored merely by removing all relevant code IDs 16 thereof from being available to the second entity 12.

Presuming that the second entity 12 decides to trust the first entity 10 based on the attestation message 20 therefrom as at step 321, the second entity 12 then proceeds to evidence such trust by constructing a trust message 24 for the first entity 12 (step 323). In one embodiment of the present invention, the trust message 24 includes therein a secret shared between the first and second entities 10, 12, where such secret allows such first and second entities 10, 12 to communicate in a secure manner.

Figure 2:
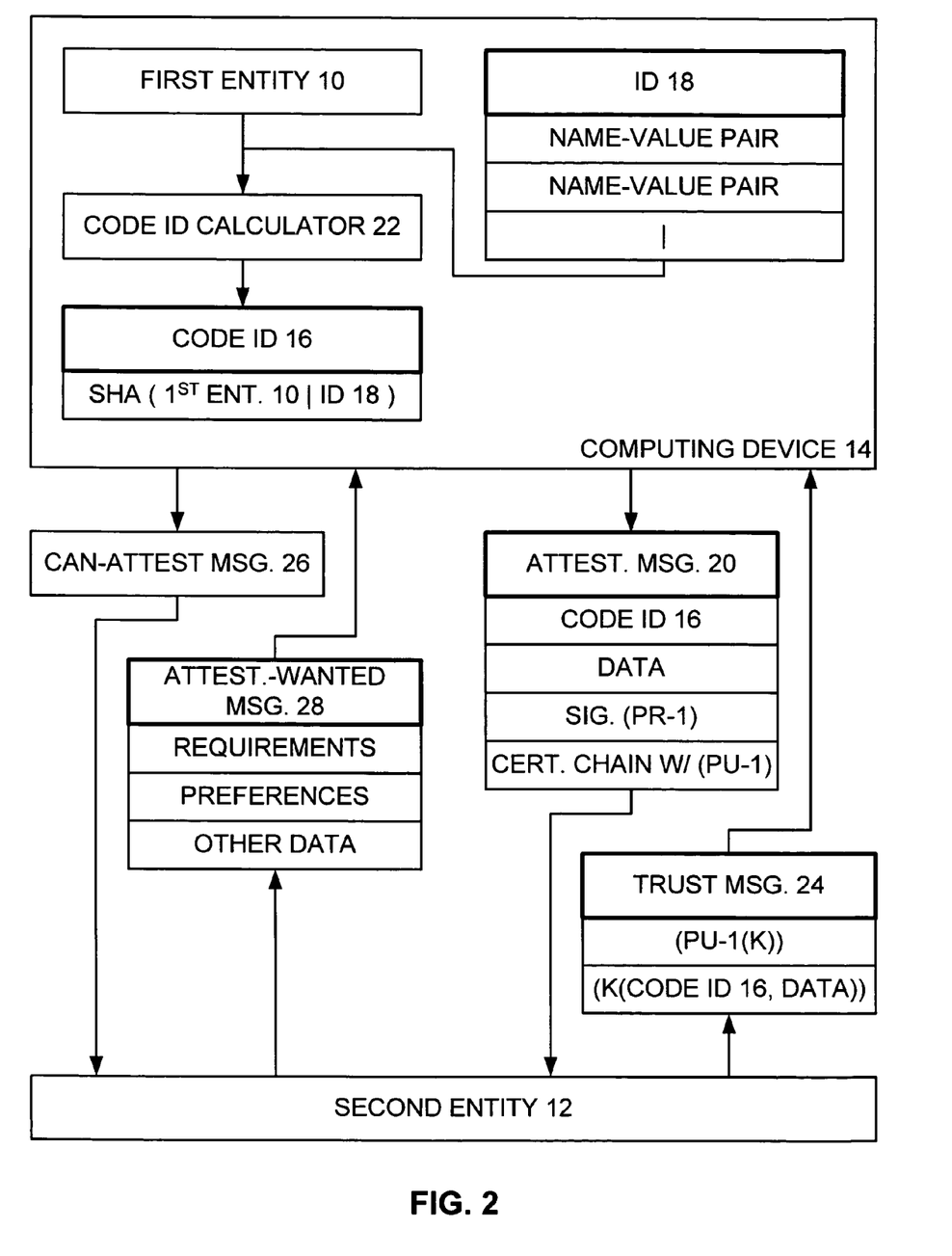
FIG. 2 is a block diagram showing a first entity attesting to a second entity and the second entity establishing trust in the first entity in accordance with one embodiment of the present invention.

For example, and as seen in FIG. 2, the trust message 24 may include therein a symmetric key (K) that the first and second entities 10, 12 shall each employ to encrypt and decrypt messages therebetween. Of course, inasmuch as such a symmetric key (K) should not be transmitted to the first entity 10 in an unencrypted format, the second entity 12 should encrypt (K) according to a key decryptable by the first entity 10. Accordingly, in one embodiment of the present invention, and as seen in FIG. 2, the symmetric key representing the shared secret is encrypted according to a public key of the first entity 10 (PU-1) to result in (PU-1(K)). As should be appreciated, the first entity 10 may deliver (PU-1) to the second entity 12 in a variety of ways in the attestation message 20. For example, and as seen in FIG. 2, the certificate chain of the digital signature of the attestation message 20 may include (PU-1) therein. Alternately, (PU-1) may be part of the data of such attestation message 20. Of course, the first entity 10 should be in possession of a corresponding private key (PR-1) such that the first entity 10 can apply (PR-1) to (PU-1(K)) to result in (K).

In addition to the shared secret, the trust message 24 from the second entity 12 should also include the code ID 16 of the first entity 10 from the attestation message 20 and any other return data relevant to the purpose of the trusted relationship. As before such return data may in fact be any appropriate data without departing from the spirit and scope of the present invention. For example, such included return data may comprise an identification of a cryptographic algorithm to be employed in connection with the shared secret, an identifier for the second entity 12, another security key that is to be shared with the first entity 10, a digital certificate derived from a trusted root authority with information therein vouching for the second entity 12, an identification of a location of a resource as requested by the first entity 10 or to be provided to the second entity 12, and/or the like. Again, such return data may in actuality include transactional or other substantive information that is to be shared with the first entity 10 in the course of communication between such first and second entities 10, 12. However, and also again, it is more likely the case that the first and second entities 12 will communicate such transactional or substantive information later according to the established shared secret.

As yet, the trust message 24 from the second entity 12 to the first entity 10 includes some sort of data, the code ID 16 representative of the first entity 10 as obtained from the attestation message 20, and a shared secret. Note that the trust message 24 could also include a digital signature from the second entity 12 based on the contents of the trust message 24 and a cryptographic key, where the digital signature is verifiable by the first entity 10. However, it is to be appreciated that in the present invention the second entity 12 establishes trust in the first entity 10 based on the attestation message 20, and that the first entity 10 does not establish trust in the second entity 10, absent a corresponding attestation message 20 from such second entity 12. Accordingly, a digital signature in the trust message 24 from the second entity 12 is not deemed an absolute requirement. Nevertheless, such a digital signature may be included without departing from the spirit and scope of the present invention.

Note, too, that the second entity 12 could encrypt the data and/or the code ID 16 of the trust message 24 according to some key available to the first entity 10 (step 325). Such key could in fact be the shared secret that is included in the trust message 24, (PU-1), or another key without departing from the spirit and scope of the present invention.

Once the trust message 24 is constructed, the second entity 12 in fact sends such trust message 24 to the first entity 10 by way of an appropriate communications protocol (step 327). Upon receiving such trust message 24 (step 329), the first entity 10 locates the shared secret in the trust message 24 (step 331) and if necessary performs a decryption function to obtain same. For example, and presuming the shared secret is the symmetric key (K) encrypted according to a public key of the first entity 10 (PU-1) to result in (PU-1(K)), the first entity 10 applies (PR-1) to (PU-1(K)) to result in (K) (step 333).

Thereafter, if the second entity 12 encrypted the data and/or the code ID 16 of the trust message 24 as at step 325, the first entity decrypts same (step 335). For example, if the second entity 12 encrypted the data and/or the code ID 16 of the trust message 24 according to the shared secret, as the first entity 10 applies the obtained shared secret to decrypt same. Of course, the first entity 10 should confirm that the trust message 24 bears the code ID 16 of the trust message before employing the data obtained therefrom.

In one embodiment of the present invention, the steps of creating the trust message 24 are performed by application of the relevant information to an appropriate function. For example, such trust message 24 may be created by the second entity 12 applying the relevant information to a sealing function that automatically creates the trust message 24 in an appropriate format that is accessible to the first entity 12. In a further embodiment of the present invention, the steps of consuming the trust message 24 are performed by application of the trust message 24 to an appropriate function. For example, such trust message 24 may be consumed by the first entity 10 applying same to an unsealing function that automatically decrypts the trust message 24 based on the format thereof and that extracts the relevant information from such decrypted trust message 24 for use by the first entity 12.

Once trust has been established between the first and second entities 10, 12 based on the attestation message 20 from the first entity 10 and the trust message 24 from the second entity 12, the first and second entities 10, 12 can rely on such established trust for an indefinite period of time, and in particular can employ the shared secret to exchange information therebetween according to such established trust (step 337). Note, though, that it may be the case that the established trust expires after a time period set by the second entity 12 and presumably set forth as part of the data of the trust message 24.

Note, too, that the second entity 12 may after a period of time send another trust message 24 to the first entity 10 based on the attestation message 20 but with a different shared secret therein (step 339). Moreover, and as should now be appreciated, the second entity 12 may periodically send out trust messages 24 to the first entity 10 based on the attestation message 20, each with a different shared secret therein, in order to periodically change the shared secret and thus attempt to thwart a nefarious entity that may have discovered an already existing shared secret.

As may be appreciated, in at least some circumstances the first entity 10 prior to sending an attestation message 20 to the second entity 12 may wish to inquire whether the second entity 12 in fact requires such an attestation message 20, or may wish to inquire about any specific requirements that the second entity 12 may have with regard to a sent attestation message 20. In such situation, and in one embodiment of the present invention, the first entity 10 sends a can-attest message 26 to the second entity 12 (step 303). As should be understood, the can-attest message 26 essentially states that the first entity 10 can send an attestation message 20 but that the first entity 10 would like to know from the second entity 12 whether such an attestation message 20 is required by such second entity 12 and if so the requirements that such second entity 12 has with regard to such attestation message 20.

Note that the can-attest message 26 may have any particular format and can have any relevant information therein without departing from the spirit and scope of the present invention. For example, the relevant information should include an identification of a location of the first entity 10 so that the second entity 12 can send a response to such can-attest message 26 to the first entity 10 at the identified location. However, inasmuch as the first entity 10 is not at this point requesting that the second entity 12 in fact trust such first entity 10, such can-attest message 26 need not necessarily include the kind of identification as is necessary in the attestation message 20, such as a code ID 16.

Note too that inasmuch as the relevant information in the can-attest message 26 is likely not of a sensitive nature, such relevant information need not necessarily be encrypted in the can-attest message 26, and the can-attest message 26 need not necessarily be digitally signed. Moreover, inasmuch as the return information to be sent by the second entity 12 in response to the can-attest message 26 is also likely not of a sensitive nature, such return information also need not necessarily be encrypted by the second entity 12, and the can-attest message 26 therefore need not necessarily include a cryptographic key for encrypting such return information. Of course, such encrypting, signing, and the like can nevertheless be performed with regard to the can-attest message 26 and the return information without departing from the spirit and scope of the present invention.

In one embodiment of the present invention, in response to the can-attest message of step 303, and presuming that the second entity 12 does in fact require an attestation message 20 from the first entity 10, such second entity 12 responds by sending an attestation-wanted message 28 to the first entity 10 at a location thereof as gleaned from the can-attest message 26 (step 305). As should be understood, the attestation-wanted message 28 essentially contains the aforementioned return information, and states that the second entity 12 does in fact require an attestation message 20 from the first entity 10 and that the attestation message 20 as sent by the first entity 10 must adhere to certain requirements as defined in the attestation-wanted message 28. Based on the attestation-wanted message 28, then, the first entity 10 can send an appropriate attestation message 20 as at step 305, above.

Note that the attestation-wanted message 28 may have any particular format and can have any particular return information therein without departing from the spirit and scope of the present invention. For example, the return information should include the aforementioned requirements, and can include other features such as preferences for the attestation message 20, a specific location where the attestation message 20 is to be sent, and the like. In addition, the return information may also include other data of interest to the first entity 10, including specific features of and services available from the second entity 12, types of first entities 10 that the second entity 12 will or will not trust, types of first entities 10 that the second entity 12 will or will not provide services to, minimum requirements for trustworthiness, acceptable trustworthy third parties for certification of attestation message 20 signing keys, and the like. As before, inasmuch as the first entity 10 is not at this point requesting that the second entity 12 in fact trust such first entity 10, the return information in such attestation-wanted message 28 is likely not of a sensitive nature and therefore such return information need not necessarily be encrypted or signed by the second entity 12. Of course, such encrypting, signing, and the like can nevertheless be performed with regard to the attestation-wanted message 28 and the return information therein without departing from the spirit and scope of the present invention.

Notably, in the present invention, the first and second entities 10, 12 need not have any prior knowledge of each other in the course of the second entity 12 establishing trust in the first entity 10 based on the attestation message 20 therefrom. Instead, as long as the attestation message 20 from the first entity 10 is in a format understandable to the second entity 12 and includes a valid code ID 16 and a certificate chain leading to a root authority trusted by the second entity 12, the second entity 12 can if desired establish trust in the first entity 10. Likewise, as long as the trust message 24 from the second entity 12 is in a format understandable to the first entity 10 and includes a shared secret that represents the established trust, the first entity 10 can communicate with the second entity 12 in a trusted manner.

CONCLUSION

The present invention may be practiced with regard to any first and second entities 10, 12. More concretely, the present invention for example could be used to enable a word processor at a PC to receive word processing documents from a document server, a music player at a dedicated playing device to transmit rendered music to a speaker system, a wireless device to access a local wireless network, and the like. Accordingly, the present invention is to be interpreted to encompass any first entity 10 requesting to be trusted by a second entity 12 such that the first and second entities 10, 12 can share information in a trusted manner.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which a first computer-type entity 10 can provide an attestation of trustworthiness to a second computer-type entity 12. Significantly, the first entity 10 can make the attestation even if the first entity 10 has no prior knowledge of the second entity 12 and the second entity 12 can receive and rely upon the attestation even if the second entity 12 has no prior knowledge of the first entity 10.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method of establishing trust between a first computer entity and a server, the method comprising:

the first computer entity seeking a granting of trust from the server by sending an inquiry in the form of a can-attest message to the server, the can-attest message stating that the first computer entity can send an attestation message but that the first computer entity would like to know from the server whether such an attestation message is required, and if so any requirements that such server has with regard to such attestation message; and the server sending an attestation-wanted message to the first computer entity in response to the can-attest message, the attestation-wanted message stating that the server does in fact require an attestation message from the first computer entity and that the attestation message as sent by the first computer entity must adhere to certain requirements as defined in such attestation-wanted message, one of the certain requirements being that the attestation message is to include a code identifier (code ID) associated with the first computer entity and calculated by using a security ID associated with the first computer entity, the security ID including security information relating to the first computer entity, the security information being expressed as a number of name-value security attribute parameters, the first computer entity being an executable and referring to the parameters in the security information in the security ID to determine whether particular security behavior is allowed, the code identifier (code ID) being representative of the first computer entity and calculated as a one-way hash of a combination of the executable of the first computer entity and the security ID so that modification of the security information in the security ID causes the calculated code ID to change and the server can interpret the change as an indication that the first computer entity should not be trusted.

2. The method of claim 1 further comprising:

the first computer entity constructing, in accordance with the requirements stated in the attestation-wanted message, the attestation message to be delivered to the server, the attestation message including a code identifier (code ID) representative of the first computer entity and data relevant to the purpose of the trust-based relationship;

the first computer entity appending a digital signature to the attestation message and a certificate chain leading back to a trusted root authority, the signature being based on the code ID and data thereof and being verifiable based on a security key included in the certificate chain, the certificate chain including at least one certificate therein proffering trustworthiness of the first computer entity;

the first computer entity sending the attestation message to the server and the server receiving same, whereby the server entity verifies the signature of the received attestation message based on the included security key, whereby alteration of the code ID or data of the attestation message should cause the signature to fail to verify, the server based on such a failure dishonoring such attestation message, the server decides whether to in fact enter into the trust-based relationship with the first computer entity based on the code ID and the data in the attestation message, the server upon deciding to in fact enter into the trust-based relationship with the first computer entity constructs a trust message to be delivered to the first computer entity, the trust message establishing the trust-based relationship and including therein a secret to be shared between the first computer entity and the server, where such shared secret allows such first computer entity and the server to communicate in a secure manner, and the server sends the trust message to the first entity and the first entity receiving same; and the first computer entity obtaining the shared secret in the trust message and employing the shared secret to exchange information with the server according to the established trust-based relationship with such server.

3. The method of claim 2 wherein the code identifier (code ID) is calculated from a digest of the first computer entity, whereby alteration of the first computer entity causes the code ID to change.

4. The method of claim 3 wherein the code identifier (code ID) is calculated from the digest of the first computer entity and from security information relating thereto, whereby alteration of the first computer entity or the security information causes the code ID to change.

5. The method of claim 2 further comprising a code ID calculator of the first computer entity that is used for calculating the code ID, the code ID calculator operating in a trusted manner in a computing device.

6. The method of claim 2 wherein the first computer entity creates the attestation message by application of the code ID and data thereof to a quoting function that automatically produces the attestation message in an appropriate format that is accessible to the server.

7. The method of claim 2 wherein the server constructs a trust message including therein a shared secret comprising a symmetric key (K) that the first computer entity and the server employ to encrypt and decrypt messages therebetween, the symmetric key (K) being encrypted according to a public key (PU-1) to result in (PU-1(K)), the server obtaining (PU-1) from the certificate chain of the attestation message, the method comprising the first computer entity obtaining the symmetric key (K) from the received trust message by applying a private key (PR-1) corresponding to (PU-1) to (PU-1 (K)) to result in (K).

8. The method of claim 2 wherein the server constructs a trust message further including relevant trust data encrypted according to a key available to the first computer entity, the method comprising the first computer entity decrypting the encrypted trust data by applying the key thereto.

9. The method of claim 2 wherein the first computer entity consumes the trust message by application of same to an unsealing function that automatically extracts the shared secret and other relevant information from such trust attestation message for use by the first computer entity.

10. The method of claim 2 whereby the trust message is a first trust message and the shared secret is a first shared secret, and whereby the server constructs a second trust message to be delivered to the first computer entity, the second trust message including therein a second secret to be shared between the first computer entity and the server, where such second shared secret allows such first computer entity and the server to communicate in a secure manner, and the server sends the second trust message to the first computer entity and the first computer entity receives same, the method further comprising the first computer entity obtaining the second shared secret in the trust message and employing the second shared secret to exchange information with the server, whereby the first shared secret is no longer valid.

11. The method of claim 1, wherein the can-attest message is transmitted from the first computer entity to the server without encryption.

12. The method of claim 1, wherein each of the can-attest message and the attestation-wanted message is transmitted without encryption.

13. A method of establishing trust between two computer entities, the method comprising:
  a first computer entity seeking a granting of trust from a server by sending an inquiry in the form of a can-attest message to the server, the can-attest message stating that the first computer entity can send an attestation message but that the first computer entity would like to know from the server whether such an attestation message is required, and if so any requirements that such server has with regard to such attestation message;
  the server sending an attestation-wanted message to the first computer entity in response to the can-attest message, the attestation-wanted message stating that the server does in fact require an attestation message from the first computer entity and that the attestation message as sent by the first computer entity must adhere to certain requirements as defined in such attestation-wanted message;
  transmitting an attestation message from a first computer entity to a second computer entity, the attestation message including a code identifier (code ID) associated with the first computer entity that is calculated by using a security ID associated with the first computer entity and corresponding to a behavior parameter that is associated with a computing operation having security implications;
  ensuring that the security ID corresponding to the behavior parameter has not been tampered with, by verifying the validity of the code ID in the second computer entity, the verifying comprising determining that the first computer entity is not included in a do-not-trust list;
  transmitting a trust message from the second computer entity to the first computer entity upon successfully verifying the validity of the code ID, the trust message including a first secret that is shared between the first and the second computer entities for communicating securely over a first period of time, wherein the first period of time is determined by the second computer entity, and
  the security ID including security information relating to the first computer entity, the security information being expressed as a number of name-value security attribute parameters, the first computer entity being an executable and referring to the parameters in the security information in the security ID to determine whether particular security behavior is allowed, the code identifier (code ID) being representative of the first computer entity and calculated as a one-way hash of a combination of the executable of the first computer entity and the security ID so that modification of the security information in the security ID causes the calculated code ID to change and the second computer entity can interpret the change as an indication that the first computer entity should not be trusted.

14. The method of claim 13 wherein the first computer entity encrypts the code ID of the attestation message according to a key available to the second computer entity, the method further comprising the second computer entity decrypting such encrypted matter.

15. The method of claim 13 wherein the second computer entity consumes the attestation message by application of same to a verifying function that automatically verifies the attestation message based on a format thereof and that extracts relevant information from such verified attestation message for use by the second computer entity.

16. The method of claim 13 wherein the first computer entity is a part of a computing device, and the second computer entity decides based on the code ID in the attestation message whether the first computer entity can be trusted, and also decides based on a certificate chain of the message whether the computing device can be trusted, the certificate chain leading back to a trusted root authority.

17. The method of claim 16 wherein the second computer entity determines that the code ID is a known code ID and that the first computer entity can be trusted based on such code ID.

18. The method of claim 16 wherein the second computer entity determines from the certificate chain whether the computing device of the first computer entity should be trusted to instantiate and operate the first computer entity in a trusted manner and should be trusted to calculate the code ID properly.

19. The method of claim 18 wherein the second computer entity determines that each certificate in the certificate chain is not on a do-not-trust list.

20. The method of claim 13 wherein the trust message includes a symmetric key (K) that the first and second computer entities employ to encrypt and decrypt messages therebetween.

21. The method of claim 20 wherein the symmetric key (K) is encrypted according to a public key (PU-1) to result in (PU-1(K)), the second computer entity obtaining (PU-1) from the certificate chain of the attestation message, and wherein the first computer entity obtains the symmetric key (K) from the received trust message by applying a private key (PR-1) corresponding to (PU-1) to (PU-1(K)) to result in (K).

22. The method of claim 13 wherein the trust message further includes an identification of a cryptographic algorithm to be employed in connection with the first secret.

23. The method of claim 13 wherein the trust message further includes relevant trust data encrypted according to a key available to the first computer entity, and wherein the first computer entity decrypts the encrypted trust data by applying the key thereto.

24. The method of claim 13 wherein the second computer entity creates the trust message by application of a sealing function that automatically produces the trust message in an appropriate format that is accessible to the first computer entity.

25. The method of claim 13 wherein prior to the first computer entity transmitting the attestation message, the first computer entity sends a can-attest message to the second computer entity, the can-attest message stating that the first computer entity can send an attestation message but that the first computer entity would like to know from the second computer entity whether such an attestation message is required by such second computer entity and if so any requirements that such second computer entity has with regard to such attestation message, the method further comprising the second computer entity sending an attestation-wanted message to the first computer entity in response to the can-attest message, the attestation-wanted message stating that the second computer entity does in fact require an attestation message from the first computer entity and that the attestation message as sent by the first computer entity must adhere to certain requirements as defined in such attestation-wanted message, whereby the first computer entity thereafter sends the attestation message in accordance with the requirements stated in the attestation-wanted message.

26. The method of claim 13, wherein the security ID is stored in a location in the first computer entity, and wherein the first computer entity is constrained to executing a particular behavior only via accessing the stored location.

27. The method of claim 13, wherein the behavior parameter comprises at least one of a) opening of a file in the first computer entity or b) opening a debugging port in the first computer entity.

28. The method of claim 13, further comprising:
retransmitting the trust message from the second computer entity to the first computer entity, the retransmitted trust message including a) a second secret that is different than the first secret, and b) data to inform the first computer entity of a second period of time over which the second secret is valid.

* * * * *